United States Patent
Isaksson et al.

(10) Patent No.: US 6,167,839 B1
(45) Date of Patent: Jan. 2, 2001

(54) ARRANGEMENT AND A METHOD OF PERFORMING AN ANIMAL-RELATED ACTION

(75) Inventors: Anders Isaksson, Tullinge; Johanna Starkhammar, Hägersten, both of (SE)

(73) Assignee: Alfa Laval Agri AB, Tumba (SE)

(*) Notice: Under 35 U.S.C. 154(b), the term of this patent shall be extended for 0 days.

(21) Appl. No.: 09/242,562

(22) PCT Filed: Jul. 15, 1997

(86) PCT No.: PCT/SE97/01284

§ 371 Date: Feb. 19, 1999

§ 102(e) Date: Feb. 19, 1999

(87) PCT Pub. No.: WO98/07311

PCT Pub. Date: Feb. 26, 1998

(30) Foreign Application Priority Data

Aug. 22, 1996 (SE) .................................................... 9603054

(51) Int. Cl.[7] .................................................... A01J 5/017
(52) U.S. Cl. .................................... 119/14.08; 119/14.02; 119/14.03
(58) Field of Search ............................ 119/14.08, 14.14, 119/14.18, 14.02, 14.03

(56) References Cited

U.S. PATENT DOCUMENTS

| | | | |
|---|---|---|---|
| 4,726,322 | * | 2/1988 | Torsius ................................ 119/14.14 |
| 4,867,108 | * | 9/1989 | Montalescot et al. ............ 119/14.08 |
| 5,784,994 | * | 7/1998 | Van Der Lely .................... 119/14.08 |
| 5,791,284 | * | 8/1998 | Van Der Lely .................... 119/14.08 |
| 5,909,716 | * | 6/1999 | Van Der Lely .................... 119/14.08 |
| 5,934,220 | * | 8/1999 | Hall et al. .......................... 119/14.08 |

FOREIGN PATENT DOCUMENTS

| | | |
|---|---|---|
| 4113700 | 10/1992 | (DE) . |
| 188303 | 1/1986 | (EP) . |
| 194729 | 3/1986 | (EP) . |
| 213660 | 7/1986 | (EP) . |
| 300115 | 1/1988 | (EP) . |
| 639327 | 8/1994 | (EP) . |
| 8602505 | 5/1988 | (NL) . |

* cited by examiner

Primary Examiner—Michael J. Carone
Assistant Examiner—James S. Bergin
(74) Attorney, Agent, or Firm—Hovey, Williams, Timmons & Collins

(57) ABSTRACT

An arrangement for performing an animal-related action on an animal includes a position determining component having a detector and a processing unit for determining the position of an animal part to be subjected to the animal-related action, and a performance component such as an animal handling unit or milking robot for performing the animal-related action. The position determining component is located at a first location including a station for housing an animal and the performance component is located at a second location including a station for housing an animal at a distance from the first location. A signal line is provided for transferring the coordinates of the position determined at the first location to the performance component at the second location in order to enable the performance of the action with regard to the animal part.

20 Claims, 1 Drawing Sheet

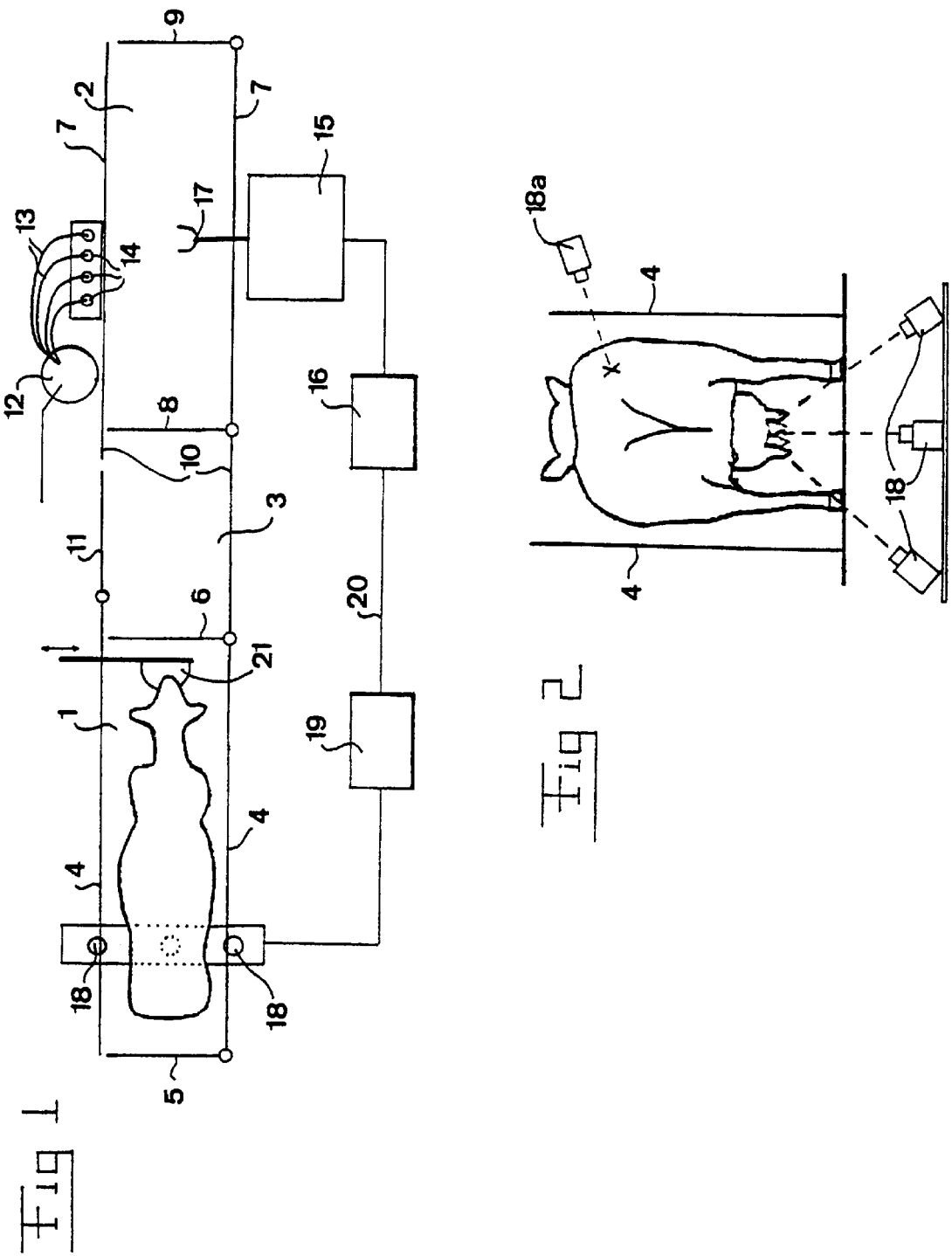

ARRANGEMENT AND A METHOD OF PERFORMING AN ANIMAL-RELATED ACTION

BACKGROUND OF THE INVENTION

The present invention refers to an arrangement for performing an animal-related action on an animal, comprising means for determining the position of an animal part to be subjected to said animal-related action, and means for performing said animal-related action. Moreover, the invention refers to a method of performing an animal-related action on an animal.

DESCRIPTION OF THE PRIOR ART

In connection with animal-related actions, it is necessary to determine the position of the animal part to be subjected to said action. E.g. in connection with automatic milking, the position of the teats is to be determined before the attachment of the teatcups to the teats.

A number of different solutions has been proposed to solve this problem. Thereby, one may differ between forcing systems and search systems. Forcing systems are based on the idea of forcing, for example by physically pushing, the animal to a determined position in the milking stall and in which the teats then may be found by means of a search equipment, for example including a video camera and image processing.

Search systems are based on the idea that the animal may stay in any position in a space, such as a milking stall, and it is the task of the search system to determine the position of the animal part. Thereby, a rough determination of the position of said part may first be performed, and from this rough position, the position of said part may be determined by means of a more sophisticated search equipment. Thereafter, a milking robot, for instance, may be activated to attach the teatcups to the teats in the positions determined by the said system. A disadvantage with such systems is that the position determining process is time-consuming, which means that a milking robot is occupied during this time period, and thus an efficient use of the milking robot is not possible to attain.

Furthermore, in connection with automatic milking it is known to determine the position of an animal in a stall by means of a device comprising spring biased arms abutting the animal and following its movements. Such a device functions for the determination of a rough position of the animal, from which position the teats, for instance, then may be found by a more sophisticated search equipment. However, such devices are mechanically very complex with many moving elements, and therefore they are subjected to wear and the reliability thereof is not satisfying. Moreover, cows being fairly strong easily may damage such arms; a mere bending thereof results in an inaccurate measurement of the animal position.

Many search systems rely for the function on individual-related data stored in the search equipment and comprising facts about the shape and the position of animal parts, such as the udder and the teats. However, since the shape of the udder is changing during the lactation period, such a method is not very exact and therefore such data need to be regularly updated in order to meet these changes. Moreover, storing of such individual-related data is a complex, time-consuming operation, especially when the herd comprises many animals.

It is also known to determine the position of the teats of an animal in connection with a milking occasion and to utilize this determined position at the next milking occasion. Such a method has the disadvantage that, due to the fact that the shape of the udder and the teats may change over the time and from one milking occasion to the next, the accuracy of the determination is not fully satisfactory.

NL-A-8 602 505 discloses an equipment for milking an animal at a milking station having means for the attachment of teatcups and means for detecting the position of the teats. Before the animal is led to the milking station it is firstly cleaned in a cleaning station and secondly milking samples are taken in a station disposed at a distance from the milking station. The milking sample station comprises means for detecting the position of the teats and a robot arm for the successive attachment of a teatcup to each of the teats. Moreover, the milking sample stations comprise means for investigating the quality of the milk and the health of the animal by measuring different milk and animal parameters. Furthermore, this document mentions the possibility of recording all measurement data for the purpose of comparisons with other measuring results.

SUMMARY OF THE INVENTION

The object of the present invention is to overcome the disadvantages mentioned above and provide an arrangement and a method by which the position of an animal part may be determined in a more efficient manner and with a high accuracy.

This object is obtained by the arrangement initially defined, which is characterized in that said position determining means is located at a first location having means for housing an animal and that said performing means is located at a second location having means for housing an animal at a distance from said first location and that means is provided for transferring the coordinates of said position determined at said first location to said performing means at said second location in order to enable the performance of said action with regard to said part. By such an arrangement the determination of an animal part may be performed before the animal-related action is to take place, which means that for example a milking robot may be utilized in an efficient manner. Moreover, the animal-related action may be performed on any animal without fetching animal-related data regarding the position of the teats from a data base. Accordingly, no individual-related data needs to be stored in advance, and furthermore it is not required to identify an individual animal for the purpose of determining the position of the teats.

According to an embodiment of the invention, said position determining means is provided to determine the position of said animal part in relation to an animal reference part of said animal. Such a relative position may easily be stored and transferred by electronic computer equipment.

According to a further embodiment of the invention, said first location is connected to said second location by an animal passage. By such a passage the animal may immediately after the determination of said position be transferred to the performing means, thereby minimizing the destruction of the determined position coordinates. Said animal passage may be defined by enclosure means.

According to a further embodiment of the invention, said first location comprises means provided to prevent the animal from moving away from said first location during at least a time period of the determining of said position. Thereby, the accuracy of the determination may be improved.

According to a further embodiment of the invention, said position determining means comprises at least one detector and processing means provided to determine said position in response to said detector. Thereby, said detector may comprise one or more of the following components; a video camera, a laser emitting device, an IR-sensor, and an ultrasonic measuring device.

According to a further embodiment of the invention, said performing means comprises an automatic handling device and animal-related means. Thereby, said animal part may comprise a teat and said animal-related means at least one teatcup to be applied to said teat of the animal by means of said automatic handling device.

The object defined above is also obtained by the method initially defined and comprising the following steps of: enabling a movement of the animal to a first location, determining the position of an animal part to be subjected to said animal-related action, enabling a movement of the animal from said first location to said second location, and performing said animal-related action with regard to said part at said determined position.

Preferred embodiments of the method are defined in the accompanying claims.

BRIEF DESCRIPTION OF THE DRAWINGS

The present invention will now be explained more closely by the description of different embodiments thereof and with reference to the drawings.

FIG. 1 shows a view from above of an arrangement according to an embodiment of the present invention.

FIG. 2 shows a front view of a position determining station of the arrangement of FIG. 1.

DETAILED DESCRIPTION OF DIFFERENT EMBODIMENTS

With reference to FIGS. 1 and 2, there is disclosed an arrangement comprising a position determining station 1 at a first location and a milking station 2 at a second location. The arrangement may be provided in a barn (not disclosed) housing many cows walking about freely. The position determining station 1 and the milking station 2 are connected to each other by an animal passage 3. The position determining station 1 is defined by enclosure means comprising lateral grids 4, an entrance gate 5 and an exit gate 6. The milking station 2 is defined by enclosure means comprising lateral grids 7, an entrance gate 8 and an exit gate 9. Also the animal passage 3 is defined by enclosure means comprising lateral grids 10, whereby the exit gate 6 of the position determining station 1 forms the entrance gate of the animal passage 3 and the entrance gate 8 of the milking station 2 forms the exit gate of the animal passage 3. As may be seen from FIG. 1, one of the lateral grids 10 may be provided with an exit gate 11. In connection to the milking station 2, there is provided a milking machine, merely represented by a receptacle container 12, four milk conduits 13 and four schematically disclosed teatcups 14 to be attached to a respective teat of the cow being present in the milking station 2. For said attachment, there is provided an automatic handling device 15 comprising a control unit 16 and a robot arm 17 having gripping means. The robot arm 17 may be controlled to grip successively a teatcup 14 and attach it to a teat of the cow.

The position determining station 1 comprises position determining means having a set of detectors 18 and a processing unit 19. In the following example, the position determining means comprises position detectors 18 in a form of video cameras. However, it should be noted that these position detectors 18 according to further embodiments of the present invention also may comprise laser emitting devices or ultrasonic measuring devices. According to a still further embodiment these position detectors 18 may comprise an infrared sensor, a so called IR-sensor. FIG. 2 discloses a set of video cameras 18 arranged in a curved configuration, such that the udder and the teats of the cow may be observed from several different directions, in particular from beneath and sidewards. Consequently, it is possible to obtain a three-dimensional image of the teats and the udder. The images from each video camera 18 is processed in the processing unit 19 for the determination of the coordinates of each teat of the cow. In particular it is the position of the teat tip which is determined. The position of the teats is determined in relation to an animal reference part of the cow. Such a reference part should be fixed and preferably not displaced over the time. For example, such reference part may be formed by the hip-joint, the shoulder, the abdomen or the udder. Such a reference part may also be formed by a natural colour spot in the fleece of the hide or a colour spot x applied to the cow. One of the video cameras, e.g. the video camera 18a disclosed in FIG. 2, may be directed to such a reference part x. The processing unit 19 is connected to the control unit 16 by a signal line 20 which is adapted to transfer the coordinates of the teats to the control unit 16. These coordinates of one cow are utilized by the control unit 16 to control the automatic handling device 15 to attach the teatcups 14 to the teats of said one cow when it arrives from the position determining station 1 to the milking station 2 via the animal passage 3.

By means of the gates 5, 6, the cow will not be able to move away from the position determining station 1. Thus, the determination of the position of the teats may be performed on an udder which is kept still. It should, however, be noted that the gates 5 and 6 may be omitted, whereby the determination of the position of the teats should be adapted to be performed with regard to a moving udder. This may be accomplished by locking a video camera, e.g. the video camera 18a, to the reference part x to follow the movements of the cow by focusing on said reference part. The video cameras 18 directed to the udder and the teats are then adapted to perform a corresponding movement. Moreover, a displaceable manger 21 may be provided to be introduced in the position determining station 1 to attract the cow and making her keep still. After the determination has been completed, the manger 21 is withdrawn. The manger 21 may be a complement to the gates 5, 6 or may replace them.

The animal passage 3 comprises an exit gate 11 by means of which the cow may be led away from the milking station if for some reason milking should not be performed.

By means of the arrangement according to the present invention, the entrance of the cow to the position determining station 1 is enabled by opening the gate 5 and e.g. by introducing the manger 21 into the position determining station 1. Thereafter, the position coordinates of the teats, and especially of the teat tips, are determined and transferred to the control unit 19. In the meantime the entrance of the cow to the milking stall 2 is enabled by opening the gates 6 and 8. The arrival of the cow to the milking station 2 is detected and thus the teatcups 14 may be attached to the teats of the cow immediately when she arrives at the milking station 2. Consequently, no time needs to be spent in the milking station 2 for the determination of the position of the teats. Since it is considered that the determination of the position of the teats in the position determining station 1 may be performed faster than the milking in the milking station 2, the station 1 may be provided with further equipment, for example for cleaning or massaging the teats of the cow, or for examination of the health condition of the cow.

Although the arrangement according to the present invention has been explained in connection with automatic milking, it should be noted that this arrangement may be utilized for the performance of any animal-related actions, such as medical treatment, insemination, teat and body cleaning, etc, and with regard to different animal parts. Thereby, the automatic handling device 15 may be adapted to handle different medical instruments, cleaning tools, etc.

Although it is considered that the determination of the position of the teats according to the present invention is sufficient for immediate attachment of the teatcups 14 when the cow arrives at the milking station 2, it should be noted that the inventive arrangement may comprise a further position determining device provided in the milking stall 2 for a final determination of the position of the teats.

The present invention is not limited to the embodiments disclosed but may be varied and modified within the scope of the following claims.

Although the present invention has been explained in connection with the cows, it should be understood that the inventive idea also may be applied to other animals, for example sheep, goats, horses, buffaloes etc.

What is claimed is:

1. An arrangement for performing an animal-related action on an animal, comprising:
    means for determining the position of an animal part to be subjected to said animal-related action; and
    means for performing the animal-related action,
    wherein said position determining means is located at a first location having means for housing an animal and said performing means is located at a second location having means for housing an animal at a distance from said first location, and further including means for transferring coordinates corresponding to said position determined at said first location to said performing means at said second location in order to enable the performance of said action with regard to the animal part.

2. An arrangement according to claim 1, wherein said position determining means is provided to determine the position of the animal part in relation to an animal reference part of the animal.

3. An arrangement according to claim 1, including an animal passage connecting said first location to said second location.

4. An arrangement according to claim 3, wherein said animal passage is defined by an enclosure.

5. An arrangement according to claim 1, wherein said first location comprises means provided to prevent the animal from moving away from said first location during at least a time period of the determining of said position.

6. An arrangement according to claim 1, wherein said position determining means comprises at least one detector and processing means provided to determine said position in response to said detector.

7. An arrangement according to claim 6, wherein said detector comprises a video camera.

8. An arrangement according to claim 6, wherein said detector comprises a laser emitting device.

9. An arrangement according to claim 8, wherein said detector comprises an IR-sensor.

10. An arrangement according to claim 9, wherein said detector comprises an ultrasonic measuring device.

11. An arrangement according to claim 1, wherein said first location is defined by an enclosure.

12. An arrangement according to claim 1, wherein said second location is defined by an enclosure.

13. An arrangement according to claim 1, wherein said performing means comprises an automatic handling device and animal-related means.

14. An arrangement according to claim 13, wherein the animal part comprises a teat and at least one teatcup to be applied to the teat of the animal by means of said automatic handling device.

15. A method of performing an animal-related action on an animal, comprising the steps of:
    enabling a movement of the animal to a first location;
    determining the position of an animal part to be subjected to said animal-related action;
    enabling a movement of the animal from said first location to a second location;
    transferring coordinates corresponding to the determined position of the animal part to means at said second location for performing the animal-related action; and
    performing said animal-related action with regard to said part at said determined position while said animal is at said second location.

16. A method according to claim 15, wherein said movement from said first to said second location is enabled by an animal passage.

17. A method according to claim 15, wherein said position is determined in relation to an animal reference part of said animal.

18. An method according to claim 15, wherein the animal is prevented from moving away from said first location during at least a time period of the determining of said position.

19. A method according to claim 15, wherein said part comprises at least one teat and that said animal-related action comprises automatic attachment of a teatcup to said teat.

20. An arrangement for performing an animal-related action on an animal, comprising:
    a sensor for determining the position of an animal part to be subjected to said animal-related action; and
    means for performing the animal-related action,
    wherein said sensor is located at a first location having an enclosure for housing an animal and said performing means is located at a second location having a second enclosure for housing an animal at a distance from said first location, and further including means for transferring coordinates corresponding to said position determined at said first location to said performing means at said second location in order to enable the performance of said action with regard to the animal part.

* * * * *